(No Model.)
H. PIETSCH.
JAR AND FASTENING THEREFOR.
No. 304,449. Patented Sept. 2, 1884.
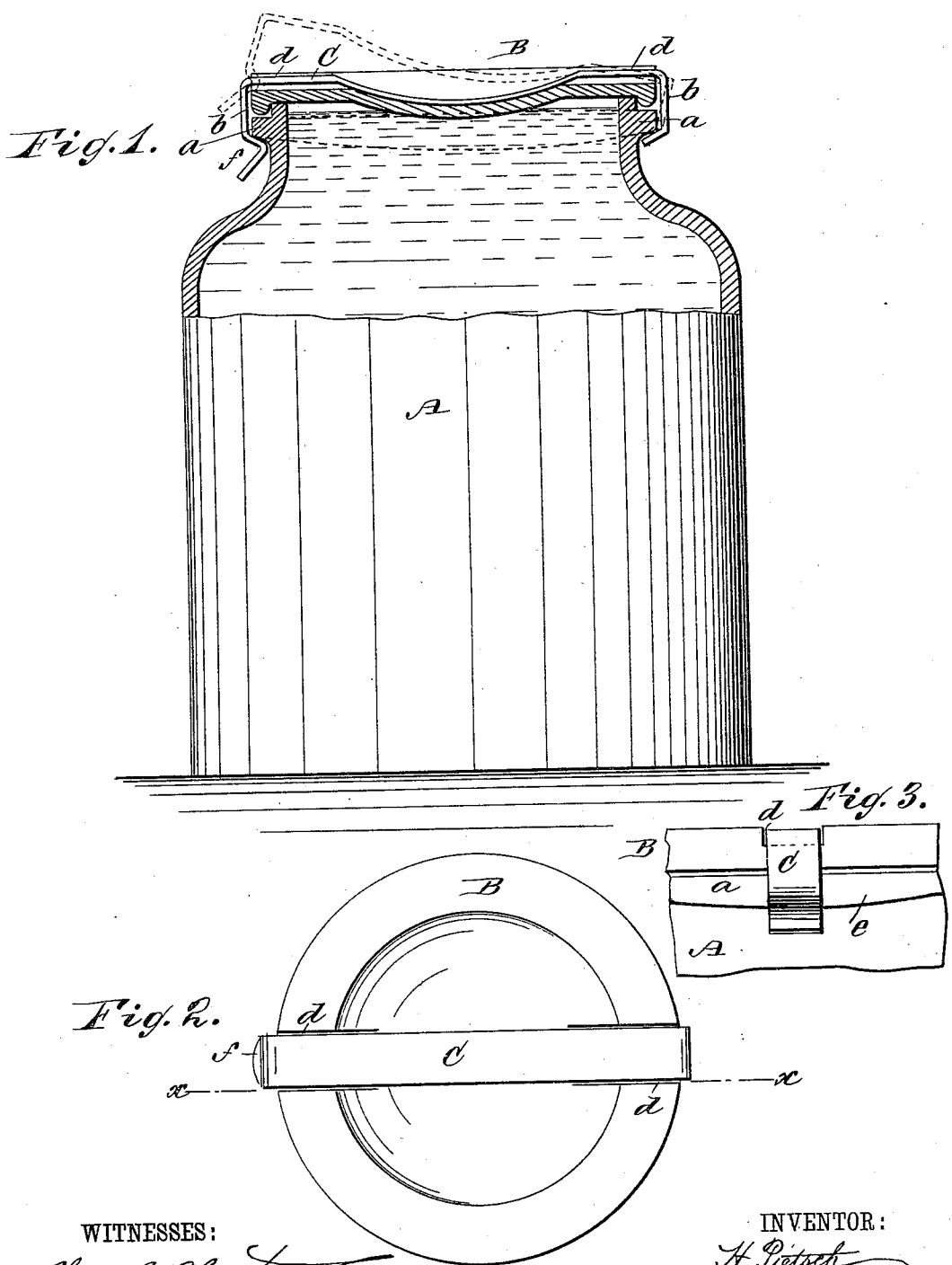
WITNESSES:
Theo. G. Hoster
C. Sedgwick
INVENTOR:
H. Pietsch
BY Munn & Co
ATTORNEYS.

UNITED STATES PATENT OFFICE.

HERMAN PIETSCH, OF FLATBUSH, NEW YORK.

JAR AND FASTENING THEREFOR.

SPECIFICATION forming part of Letters Patent No. 304,449, dated September 2, 1884.

Application filed May 17, 1884. (No model.)

*To all whom it may concern:*

Be it known that I, HERMAN PIETSCH, of Flatbush, in the county of Kings and State of New York, have invented a new and Improved Jar and Fastening therefor, of which the following is a full, clear, and exact description.

My invention relates to improvements in fruit-jars; and it consists in the peculiar construction and arrangement of parts, all as hereinafter fully described, and pointed out in the claims.

Reference is to be had to the accompanying drawings, forming a part of this specification, in which similar letters of reference indicate corresponding parts in all the figures.

Figure 1 is a sectional elevation of the jar with my improved fastening applied to the cover. Fig. 2 is a top view of the cover, and Fig. 3 is a detail view.

The jar or vessel A may be made of any ordinary form and of any material, according to its intended uses. Near the edge of its mouth and on the outside is a flange, $a$, which is made with double inclines on the lower edge, as shown in Fig. 3.

B is the cover, and C is the clamp. The clamp C is a strap of spring metal, having its ends bent to form hooks $b$ $b$, that take beneath the flange $a$ of the jar. On one hook, $b$, is a lug, $f$, projecting outward for being grasped to spring that end of the clamp free in opening the jar. To apply the fastening, one end is caught beneath flange $a$, with the clamp in position, as shown by dotted lines, and the end with lug $f$, being pressed upon the hook, springs to place. The cover has a concave top, as shown. The clamp is bent to the concave and bears on that portion only, so as to give even pressure all around. The cover is also grooved at the edges of the concave, as shown at $d$, for receiving the clamp, so as to be even on top and to keep the clamp from turning. The inclines $e$ serve to tighten the clamp in case of variations in thickness of the covers and flanges, so that the fastening will operate properly. The bend in the clamp gives the spring to it.

Having thus fully described my invention, I claim as new and desire to secure by Letters Patent—

1. The jar A, provided with the flanges $a$, having double inclines $e$, in combination with the cover B, provided with the grooves $d$, and the clamp C, provided with the hooks $b$, substantially as herein shown and described.

2. The combination, with the jar A, provided with flanges $a$, having double inclines $e$, of the concave cover B, provided with the grooves $d$, and the concave clamp C, provided with the hooks $b$, one of which hooks is provided with lug $f$, substantially as herein shown and described.

HERMAN PIETSCH.

Witnesses:
GEO. D. WALKER,
C. SEDGWICK.